US012681650B2

(12) United States Patent
Prakash et al.

(10) Patent No.: US 12,681,650 B2
(45) Date of Patent: Jul. 14, 2026

(54) EXPANDER DEVICE CHANNEL LOCKING FOR A MEMORY DEVICE

(71) Applicant: Micron Technology, Inc., Boise, ID (US)

(72) Inventors: Gyan Prakash, Bangalore (IN); Leonid Minz, Beer Sheva (IL)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/958,719

(22) Filed: Nov. 25, 2024

(65) Prior Publication Data

US 2025/0173071 A1     May 29, 2025

Related U.S. Application Data

(60) Provisional application No. 63/604,011, filed on Nov. 29, 2023.

(51) Int. Cl.
*G06F 3/06* (2006.01)

(52) U.S. Cl.
CPC .......... *G06F 3/0625* (2013.01); *G06F 3/0634* (2013.01); *G06F 3/0679* (2013.01)

(58) Field of Classification Search
CPC .......... G06F 13/16; G06F 13/14; G06F 13/20; G06F 13/36; G06F 13/1605; G06F 13/1684; G06F 13/1668; G06F 13/1694; G06F 3/0625; G06F 3/0634; G06F 3/0679; G06F 3/0659; G06F 3/0658; G06F 3/0604; G06F 3/0683; G06F 3/0635; G06F 2212/7206
See application file for complete search history.

(56) References Cited

U.S. PATENT DOCUMENTS

| | | | |
|---|---|---|---|
| 10,372,339 B2 * | 8/2019 | Webb .................. | G06F 11/1016 |
| 2021/0132798 A1 * | 5/2021 | McGlaughlin ........ | G06F 3/0635 |
| 2021/0303484 A1 * | 9/2021 | Vaysman ............ | G06F 13/4282 |
| 2022/0237139 A1 * | 7/2022 | Richter .............. | G06F 13/1668 |
| 2022/0357862 A1 * | 11/2022 | Basu ................. | G06F 3/0604 |
| 2023/0075279 A1 * | 3/2023 | Rajgopal ............ | G06F 13/1668 |

OTHER PUBLICATIONS

ONFI, Open NAND Flash Interface Specification, Mar. 9, 2011, ONFI, Revision 3.0, pp. ii-282 (Year: 2011).*

* cited by examiner

*Primary Examiner* — Curtis James Kortman
(74) *Attorney, Agent, or Firm* — Brooks, Cameron & Huebsch, PLLC

(57) ABSTRACT

A method includes receiving, by a memory device interface, a signal at a front side of a command enable channel from a host, locking, by the memory device interface, a back side of a command enable channel in response to the signal, receiving, by the memory device interface, the command at a data channel from the host, and unlocking, by the memory device interface, the back side of the command enable channel in response to receiving the command at the data channel.

20 Claims, 6 Drawing Sheets

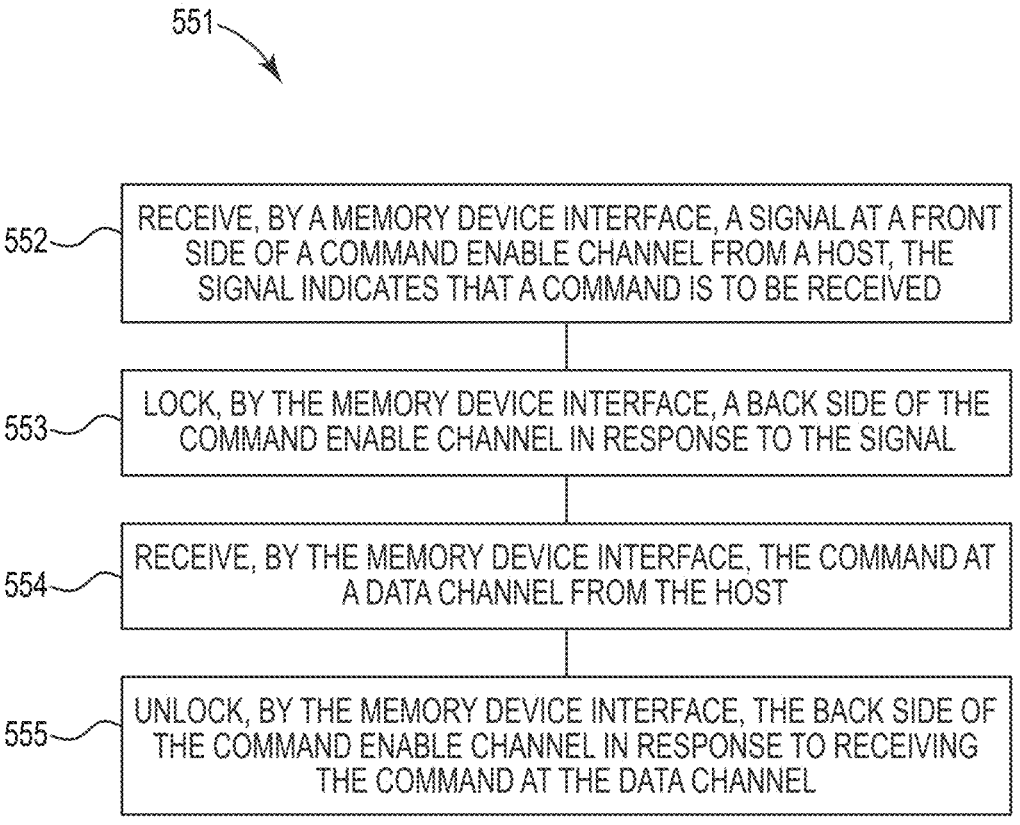

551

552 — RECEIVE, BY A MEMORY DEVICE INTERFACE, A SIGNAL AT A FRONT SIDE OF A COMMAND ENABLE CHANNEL FROM A HOST, THE SIGNAL INDICATES THAT A COMMAND IS TO BE RECEIVED

553 — LOCK, BY THE MEMORY DEVICE INTERFACE, A BACK SIDE OF THE COMMAND ENABLE CHANNEL IN RESPONSE TO THE SIGNAL

554 — RECEIVE, BY THE MEMORY DEVICE INTERFACE, THE COMMAND AT A DATA CHANNEL FROM THE HOST

555 — UNLOCK, BY THE MEMORY DEVICE INTERFACE, THE BACK SIDE OF THE COMMAND ENABLE CHANNEL IN RESPONSE TO RECEIVING THE COMMAND AT THE DATA CHANNEL

FIG. 5

EXPANDER DEVICE CHANNEL LOCKING FOR A MEMORY DEVICE

PRIORITY INFORMATION

This application claims the benefit of U.S. Provisional Application No. 63/604,011, filed on Nov. 29, 2023, the contents of which are incorporated herein by reference.

TECHNICAL FIELD

Embodiments of the disclosure relate generally to memory sub-systems, and more specifically, relate to expander device channel locking for a memory device.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

FIG. 5 is a flow diagram corresponding to a method for channel locking in accordance with some embodiments of the disclosure.

DETAILED DESCRIPTION

Figure 1:
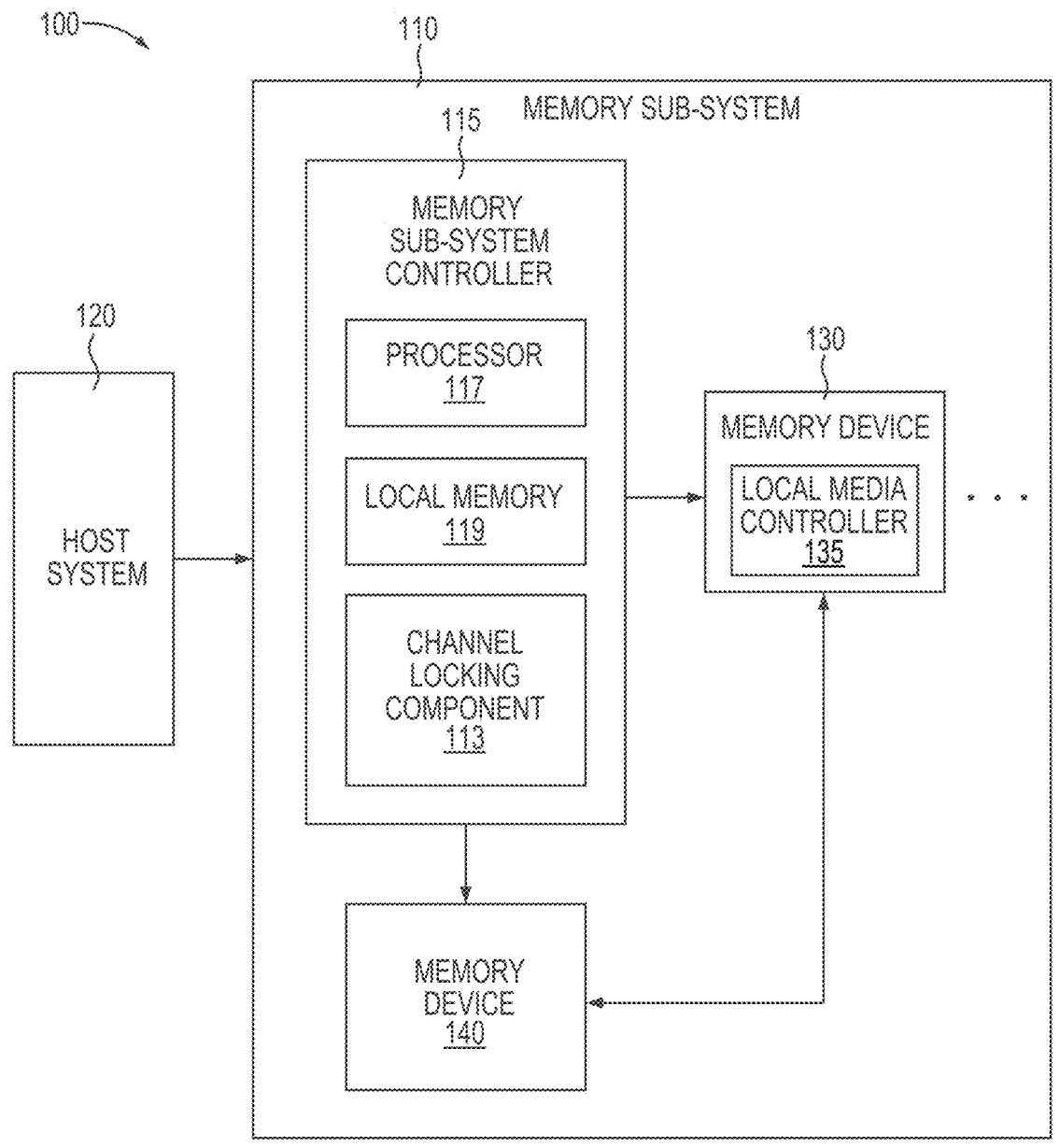
FIG. 1 illustrates an example computing system that includes a memory sub-system in accordance with some embodiments of the disclosure.

Aspects of the present disclosure are directed to expander device channel locking for a memory device, in particular to memory sub-systems that include a channel locking component. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. One example of non-volatile memory devices is a negative- and (NAND) memory device (also known as flash technology). As used herein, a NAND memory device can include either a set of flash memory dice or a combination of the flash memory dice and a non-volatile memory (NVM) controller. The NVM controller can include circuitry for performing read/write operations as described herein. Other examples of non-volatile memory devices are described below in conjunction with FIG. 1. A non-volatile memory device is a package of one or more dice. Each die can consist of one or more planes. Planes can be grouped into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information. A block hereinafter refers to a unit of the memory device used to store data and can include a group of memory cells, a word line group, a word line, or individual memory cells. For some memory devices, blocks (also hereinafter referred to as "memory blocks") are the smallest area that can be erased. Pages cannot be erased individually, and only whole blocks can be erased.

Each of the memory devices can include one or more arrays of memory cells. Depending on the cell type, a cell can be written to in order to store one or more bits of binary information, and has various logic states that correlate to the number of bits being stored. The logic states can be represented by binary values, such as "0" and "1", or combinations of such values. There are various types of cells, such as single-level cells (SLCs), multi-level cells (MLCs), triple level cells (TLCs), and quad-level cells (QLCs). For example, a SLC can store one bit of information and has two logic states.

Some NAND memory devices employ a floating-gate architecture in which memory accesses are controlled based on a relative voltage change between the bit line and the word lines. Other examples of NAND memory devices can employ a replacement-gate architecture that can include the use of word line layouts that can allow for charges corresponding to data values to be trapped within memory cells based on properties of the materials used to construct the word lines.

In some previous approaches, an input/output (IO) expander (IOE) device can be placed between a host and memory dice. For example, an IOE device can be placed between a host device a plurality of NAND dice (or "LUNs"). The host side of the IOE device can be referred to as a front side (front end) and the memory dice side of the IOE device can be referred to as the back side (back end). The IOE device can allow a host to see a single die load at the IOE device front side (FS). The NAND die loads can be distributed across multiple IOE back side channels. These previous IOE devices can implement a crossbar switch to route the intended traffic to target NAND dies. As used herein, a crossbar switch includes a collection of switches arranged in a matrix configuration. A crossbar switch can have multiple input and output lines that form a crossed pattern of interconnecting lines between which a connection may be established by closing a switch located at each intersection, the elements of the matrix.

In some previous approaches, the IOE device can receive communication at a front side from a host device and provide the communication to a memory resource at a back side. In these previous approaches the host device can utilize commands during operation. In these previous embodiments, the command enable signals of the commands can be passed through to the same memory resource as the payload or other parts of the communication. In some previous embodiments, there can be a risk that the signals will cause a malfunction with the memory resource. In some embodiments, it can be difficult or not possible to filter the signals from being provided to the memory resource, which can cause delays or malfunctions related to the host communicating with the memory resource. In addition, previous embodiments can have an IOE device that utilizes a data channel that is always activated or able to receive data communication. These previous embodiments can waste electrical power during operations when the data channel is not being utilized by the host.

Aspects of the present disclosure address the above and other deficiencies by employing an IOE device that utilizes channel locking. For instance, aspects of the present disclosure can utilize a channel locking component that can be configured to receive signals at a front side command enable channel that indicates when a command is to be received at a front side of a data channel. In this way, the data channel can be disabled during operation until the IOE device receives the signal at the front side command enable channel. In these embodiments, the IOE device can conserve or save power while not in use and still be able to receive data channel commands.

In some embodiments, the command can pass through a back end of the command enable channel and negatively affect a performance of a memory device (e.g., NAND, LUN, etc.) coupled to the back end of the IOE device. In some embodiments, the IOE device can lock the back side of the command enable channel in response to receiving the signal at the front side of the command enable channel. In this way, the host can send a command, such as a volume select command, without having a command enable signal being transferred to the memory device coupled to the back side of the IOE device. In some embodiments, the IOE device can receive the command from the host and unlock the back side of the command enable channel in response to receiving the command at the front side of the data channel. In this way, the host can then continue to utilize the IOE device to communicate with the memory device coupled to the back side of the IOE device. In some embodiments, the IOE device can disable the data channel when the host selects a different IOE device with the command. In this way, the IOE device can conserve power until an additional signal is received at the front side of the command enable channel by the host.

FIG. 1 illustrates an example computing system that includes a memory sub-system 110 in accordance with some embodiments of the disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single-level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, a MLC portion, a TLC portion, a QLC portion, and/or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

As described above, the memory components can be memory dice or memory packages that form at least a portion of the memory device 130. In some embodiments, the blocks of memory cells can form one or more "superblocks." As used herein, a "superblock" generally refers to a set of data blocks that span multiple memory dice and are written in an interleaved fashion. For instance, in some embodiments each of a number of interleaved NAND blocks can be deployed across multiple memory dice that have multiple planes and/or pages associated therewith. The terms "superblock," "block," "block of memory cells," and/or "interleaved NAND blocks," as well as variants thereof, can, given the context of the disclosure, be used interchangeably.

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140. For instance, in some embodiments, the memory device 140 can be a DRAM and/or SRAM configured to operate as a cache for the memory device 130. In such instances, the memory device 130 can be a NAND.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 135) for media management within the same memory device package. An example of a managed memory device is a managed NAND (MNAND) device. The memory sub-system 110 can also include additional circuitry or components that are not illustrated.

The memory sub-system 110 can include a channel locking component 113, which may be referred to in the alternative as a "controller," herein. Although not shown in FIG. 1 so as to not obfuscate the drawings, the channel locking component 113 can include various circuitry to facilitate aspects of media management, as detailed herein. In some embodiments, the channel locking component 113 can include special purpose circuitry in the form of an ASIC, FPGA, state machine, and/or other logic circuitry that can allow the channel locking component 113 to orchestrate and/or perform the operations described herein.

In some embodiments, the memory sub-system controller 115 includes at least a portion of the channel locking component 113. For example, the memory sub-system controller 115 can include a processor 117 (processing device) configured to execute instructions stored in local memory 119 for performing the operations described herein. In some embodiments, the channel locking component 113 is part of the memory sub-system 110, an application, or an operating system.

In a non-limiting example, an apparatus (e.g., the computing system 100) can include a channel locking component 113. The channel locking component 113 can be resident on the memory sub-system 110. As used herein, the term "resident on" refers to something that is physically located on a particular component. For example, the channel locking component 113 being "resident on" the memory sub-system 110 refers to a condition in which the hardware circuitry that comprises the channel locking component 113 is physically located on the memory sub-system 110. The term "resident on" can be used interchangeably with other terms such as "deployed on" or "located on," herein.

As described further herein, the computing system 100 can include an IOE device that can be utilized to connect a host (e.g., host system 120, etc.) to a memory device (e.g., memory device 130, etc.). In some embodiments, the IOE device can be coupled to the host at a front side and coupled to a memory device at a back side. The host can configure the IOE device based on properties of the memory device. For example, the configuration signals from the host can be received at a chip enable pin of the IOE device. In previous approaches, the configuration signals can be provided to the memory device even though the configuration signals are not intended to be received by the memory device. As described herein, the configuration signals can be detrimental to the performance of the memory device. In some embodiments, the channel locking component 113 can be utilized to filter or prevent the signals from being provided to a memory device.

The channel locking component 113 can be configured to identify a low to high transition signal at a front side of a command enable channel. As described herein, the channel locking component 113 can identify a signal received at a front side of the command enable channel of an IOE device. In some embodiments, the signal received at the front side of the command enable channel is a low to high transition signal. As used herein, a low to high transition signal refers to a binary signal transition from a low voltage level to a high voltage level. As described further herein, a front side of an IOE device can include a plurality of channels or a plurality of connections coupled to a host. In addition, the back side of the IOE device can include a plurality of channels or a plurality of connections coupled to memory devices. In this way, the host can utilize the IOE device to communicate or send signals to the memory devices.

In some embodiments, the signal (e.g., low to high transition signal, etc.) can be an indication to the channel locking component 113 that a data command is to be received at a front side of a data channel. For example, the signal can be an indication or notification to the IOE device or channel locking component 113 that a host is to send a command to the front side of the data channel of the IOE device. In this way, the host can send the signal to notify the IOE device that a particular command is about to be provided to the IOE device. In a specific example, the host can send a low to high transition signal to the front side of the command enable channel of the IOE device. In this specific example, the low to high transition signal can be an indication from the host that the host is going to send a volume select command to a front side of a data channel to the IOE device.

The channel locking component 113 can be configured to receive a de-assert signal of the command enable channel from the host. As used herein, a de-assert signal can be a signal utilized by a host to disable or deactivate a particular function or operation. In these embodiments, the de-assert signal can be the low to high transition signal from the host that can be utilized to disable the back side of the command enable channel.

The channel locking component 113 can be configured to lock a back side of the command enable channel in response to identifying the low to high transition signal. In some embodiments, the channel locking component 113 can identify the low to high transition signal from the host and determine that the host is going to send a command to the front side of a data channel of the IOE device. In some embodiments, the back side of the command enable channel is locked to prevent signals associated with the command from reaching or being provided to a memory resource coupled to the back side of the IOE device. In a specific example, the memory die of the plurality of memory dice does not register the command when the back side of the command enable channel is locked. For example, the data channel portion of the signal can pass to the memory dice, but since the command enable portion of the signal does not pass to the memory dice, the memory dice does not register the command. In a specific example, the channel locking component 113 can determine that a volume select command is to be provided to one of a plurality of IOE devices coupled to a host. In this way, the volume select command may pass through the IOE device to a memory die, but since the back side of the command enable channel is locked, the memory die can ignore the volume select command. In this way, the volume select command will not alter a functionality or performance of the memory die.

As used herein, a volume select command can be an instruction from a host device that indicates a particular volume or storage unit for subsequent operations. For example, the volume select command can be logical partition or physical storage device. Volumes can be utilized by memory devices to manage data within a computing system. In some embodiments, the volume select command can allow host to choose a specific volume or storage unit on which subsequent operations, such as reading, writing, formatting, or management tasks, will be performed. This command provides a way to address and access data within a specific volume rather than operating on the entire storage device.

The channel locking component 113 can be configured to start a command timer to determine when a threshold quantity of time from receiving the low to high transition signal has been met. In some embodiments, the host can provide the command to a different IOE device associated with a different memory device. In some embodiments, the channel locking component 113 can determine that the threshold quantity of time has passed and determine that the host has sent the command to a different IOE device. In this way, the channel locking component 113 can wait for the threshold quantity of time to receive a command from the host at a front side of the data channel before disabling the data channel. In this way, the data channel can remain disabled unless the IOE device is going to receive a command at the front side of the data channel from a host.

The channel locking component 113 can be configured to unlock the back side of the command enable channel in response to receiving a command at the data channel within the threshold quantity of time. In some embodiments, the channel locking component 113 can determine that a command, such as a volume select command, is received at the front side of the data channel. In these embodiments, the channel locking component can implement the instruction of the command and unlock the back side of the command enable channel to allow the host to send command enable signals through the command enable channel. In this way, the command provided to the front side of the data channel will not affect the memory resource coupled to the back side of the IOE device while the subsequent commands provided by the host will be provided to the memory resource.

In other embodiments, the channel locking component 113 can be configured to identify a low to high transition signal at a front side of a command enable channel. As described herein, the low to high transition signal can be an indication or notification to the channel locking component 113 that a command is to be received by a host device at a front side of the data channel of the IOE device. In these other embodiments, the channel locking component 113 can be configured to lock a back side of the command enable channel in response to identifying the low to high transition signal. Locking the back side of the command enable channel can prevent signals received from the front side of the command enable channel from being provided to memory resources coupled to the back side of the command enable channel.

In these other embodiments, the channel locking component 113 can be configured to start a command timer to determine when a threshold quantity of time from receiving the low to high transition signal has been met. In some embodiments, the command timer can be a timer device that can identify when a threshold quantity of time has elapsed from receiving the low to high transition signal. In some embodiments, the channel locking component 113 can utilize the command timer to identify when a quantity of time has passed since the low to high transition signal. In these embodiments, the channel locking component 113 can determine that a command is not to be provided when the command timer has exceeded the threshold quantity of time.

In these other embodiments, the channel locking component 113 can be configured to unlock the back side of the command enable channel in response to receiving a volume select command that selects the first memory device interface at the data channel within the threshold quantity of time. As described herein, the back side of the command enable channel can be unlocked to allow a host to send command enable signals to a memory resource coupled to the first memory device interface in response to receiving the volume select command.

In these other embodiments, the channel locking component 113 can be configured to deactivate the data channel when the volume select command selects a second memory device interface. As described herein, the host can select a different IOE device. In these embodiments, the channel locking component 113 can determine that a different IOE device was selected by the volume select command from the host and in response the channel locking component 113 can deactivate the data channel to conserve power since the host will utilize the different IOE for a subsequent command or instruction.

In these other embodiments, the channel locking component 113 can be configured to unlock the back side of the command enable channel when the threshold quantity of time is met. As described herein, the channel locking component 113 can unlock the back side of the command enable channel to allow the host to provide command enable signals to the IOE device and/or to the memory resources associated with the IOE device.

Figure 2:
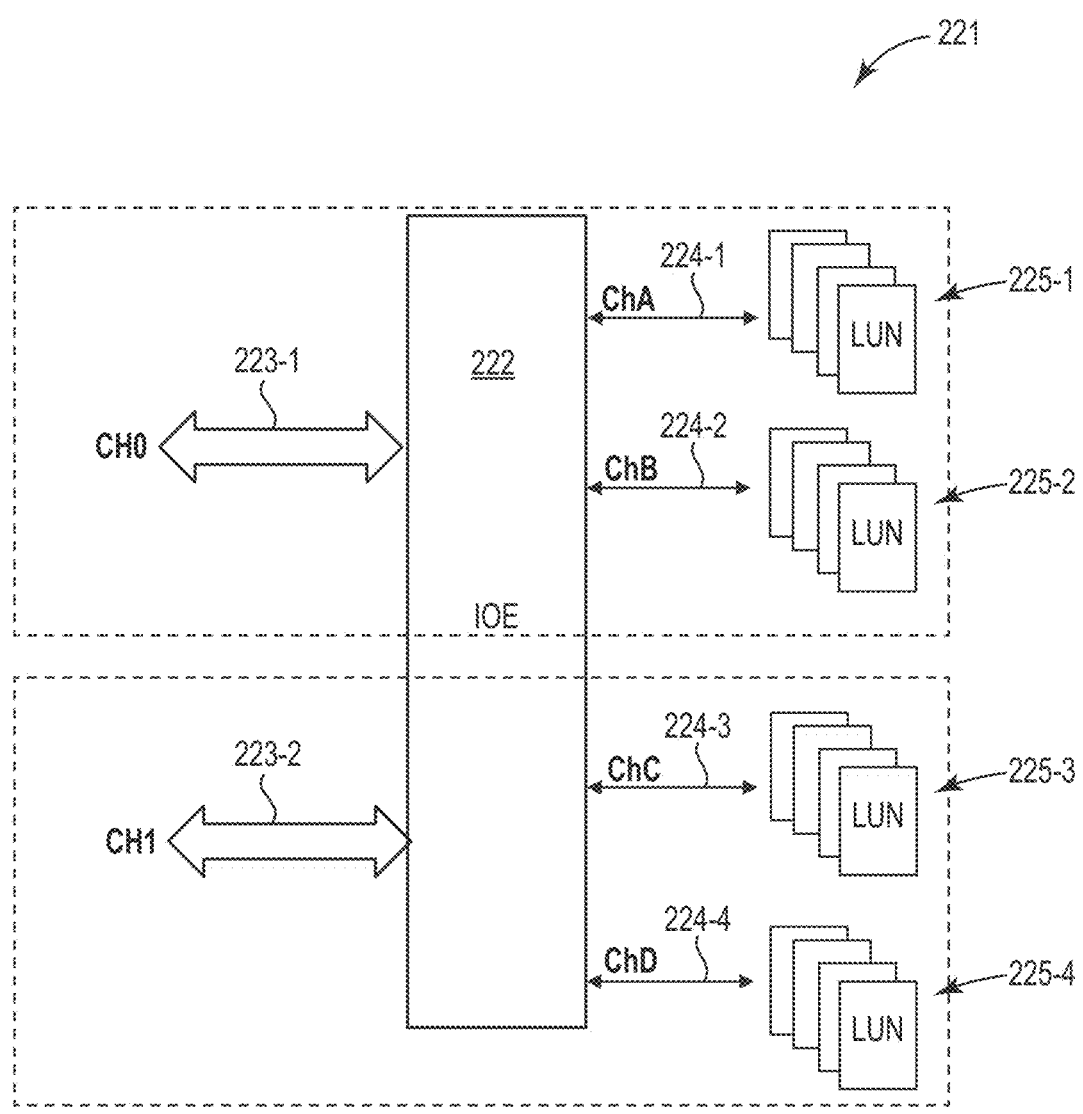
FIG. 2 illustrates a system that includes a multi-channel input/output expander in accordance with some embodiments of the disclosure.

FIG. 2 illustrates a system 221 that includes a multi-channel input/output expander (IOE) device 222 in accordance with some embodiments of the disclosure. The IOE device 222 can include a device that utilizes a first input channel 223-1 and a second input channel 223-2 that can be connected to a host device or host system. In some embodiments, the IOE device 222 can operate in a one channel mode and/or a two channel mode. In these embodiments, the IOE device 222 can utilize only the first input channel 223-1 in the one channel mode and utilize both the first input channel 223-1 and the second input channel 223-2 in the two channel mode. In some embodiments, the second input channel 223-2 is disabled to execute a one channel mode utilizing the first input channel 223-1.

In some embodiments, the IOE device 222 can include a first plurality of output channels 224-1, 224-2 and a second plurality of output channels 224-3, 224-4. In some embodiments, a first output channel 224-1 can be coupled to a first portion of LUNs 225-1, a second output channel 224-2 can be coupled to a second portion of LUNs 225-2, a third output channel 224-3 can be coupled to a third portion of LUNs 225-3, and a fourth output channel 224-4 can be coupled to a fourth portion of LUNs 225-4. In a one channel mode, the first input channel 223-1 can be utilized to access the plurality of LUNs 225-1, 225-2, 225-3, 225-4. In a two channel mode, the first input channel 223-1 can be utilized to access the first portion of LUNs 225-1 and the second portion of LUNs 225-2 through the first plurality of output channels 224-1, 224-2 and the second input channel 223-2 can be utilized to access the third portion of LUNs 225-3 and the fourth portion of LUNs 225-4 through the second plurality of output channels 224-3, 224-4.

In some previous approaches, a host can provide signals to the IOE device 222 through one of the first input channel 223-1 and the second input channel 223-2. In these previous approaches, signals intended for the IOE device 222 can be transferred to one or more of the plurality of LUNs 225-1, 225-2, 225-3, 225-4. As described further herein, the signals intended for the IOE device 222 can cause unexpected or unintended alterations of the plurality of LUNs 225-1, 225-2, 225-3, 225-4. The present disclosure can utilize an IOE device 222 that includes a channel locking component (e.g., channel locking component 113 as referenced in FIG. 1, etc.). The channel locking component can be configured to perform methods and/or processes described herein.

Figure 3:
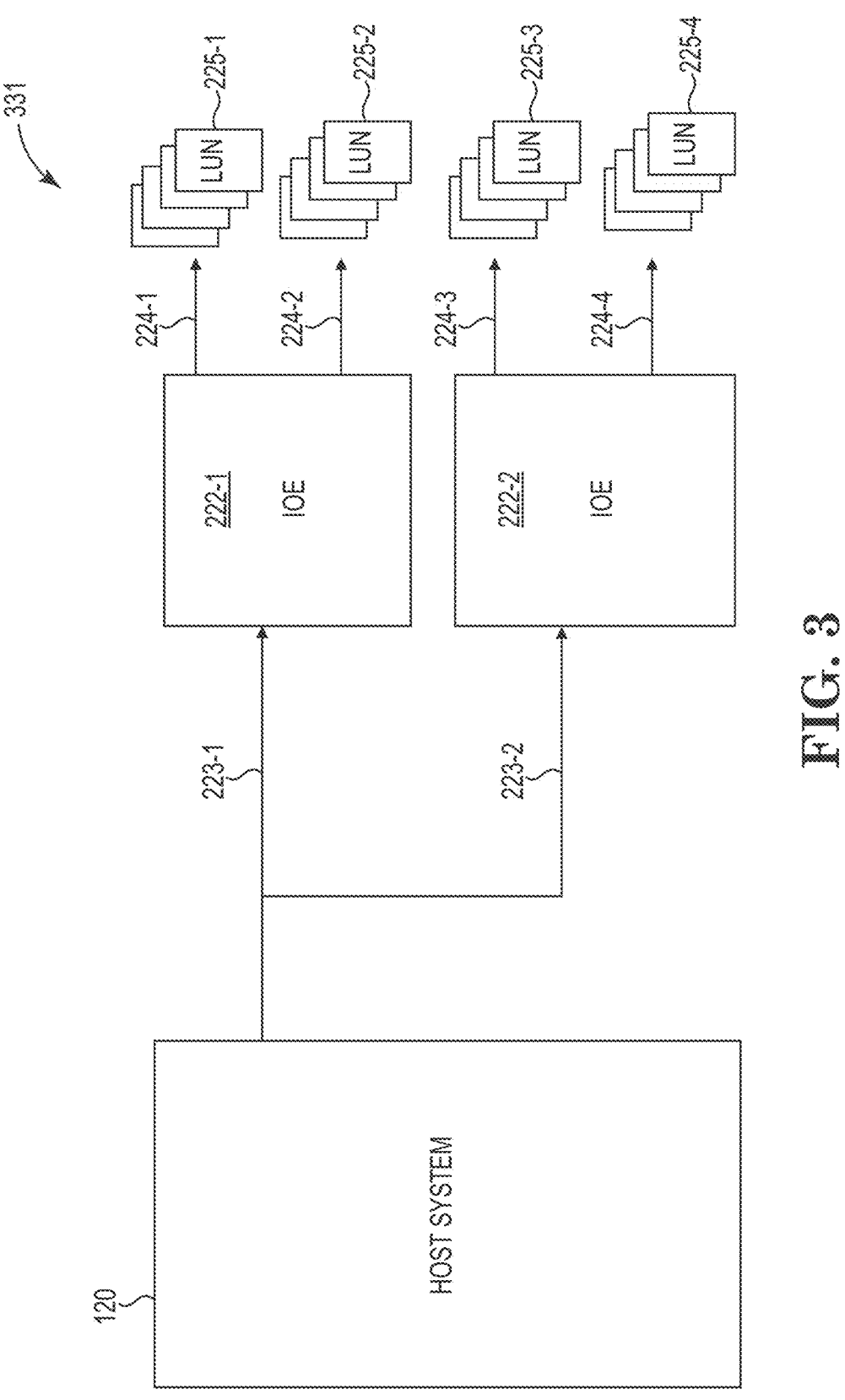
FIG. 3 illustrates a system that includes a multi-channel input/output expander in accordance with some embodiments of the disclosure.

FIG. 3 illustrates a system 331 that includes a multi-channel input/output expander 222-1, 222-2 in accordance with some embodiments of the disclosure. In some embodiments, the system 331 illustrates when a plurality of memory device interfaces are configured in a multi-drop configuration. As used herein, a multi-drop configuration refers to a plurality of devices that are connected to a shared communication bus. By sharing a common bus, multiple memory devices can be connected using fewer physical connections, reducing the overall system complexity and wiring requirements. This configuration is commonly used in scenarios where multiple memory devices need to be accessed or controlled by a single device (e.g., host system 120, etc.).

The system 331 can include a first IOE device 222-1 and a second IOE device 222-2 coupled to a host system 120. The host system 120 can be coupled to the first IOE device 222-1 through a first input channel 223-1 and/or a plurality of first input channels 223-1. In a similar way, the host system 120 can be coupled to the second IOE device 222-2 through a second input channel 223-2 and/or a plurality of second input channels 223-2.

In some embodiments, the first IOE device 222-1 can include a first plurality of output channels 224-1, 224-2 and the second IOE device 222-2 can include a second plurality of output channels 224-3, 224-4. In some embodiments, a first output channel 224-1 can be coupled to a first portion of LUNs 225-1, a second output channel 224-2 can be coupled to a second portion of LUNs 225-2, a third output channel 224-3 can be coupled to a third portion of LUNs 225-3, and a fourth output channel 224-4 can be coupled to a fourth portion of LUNs 225-4.

In some previous approaches, the host system 120 can provide signals to the first IOE device 222-1 or the second IOE device 222-2 through one of the first input channel 223-1 and the second input channel 223-2. In these previous approaches, signals intended for the first IOE device 222-1 or the second IOE device 222-2 can be transferred to one or more of the plurality of LUNs 225-1, 225-2, 225-3, 225-4. As described further herein, the signals intended for the first IOE device 222-1 or the second IOE device 222-2 can cause unexpected or unintended alterations of the plurality of LUNs 225-1, 225-2, 225-3, 225-4. The present disclosure can utilize the first IOE device 222-1 and/or the second IOE device 222-2 that includes a channel locking component (e.g., channel locking component 113 as referenced in FIG. 1, etc.). The channel locking component can be configured to perform methods and/or processes described herein.

In some embodiments, the host system 120 can send a low to high transition signal to the first IOE device 222-1 and/or the second IOE device 222-2. As described herein, the low to high transition signal can be utilized as a notification or indication to the first IOE device 222-1 and/or the second IOE device 222-2 that the host system 120 is to provide a command to the first IOE device 222-1 and/or the second IOE device 222-2. In some embodiments, the command can be a volume select command that identifies one of the plurality of LUNs 225-1, 225-2, 225-3, 225-4. In this way, the first IOE device 222-1 and/or the second IOE device 222-2 can include a channel locking component to lock and unlock a back side of a chip enable channel and/or activate and deactivate a data channel.

Figure 4:
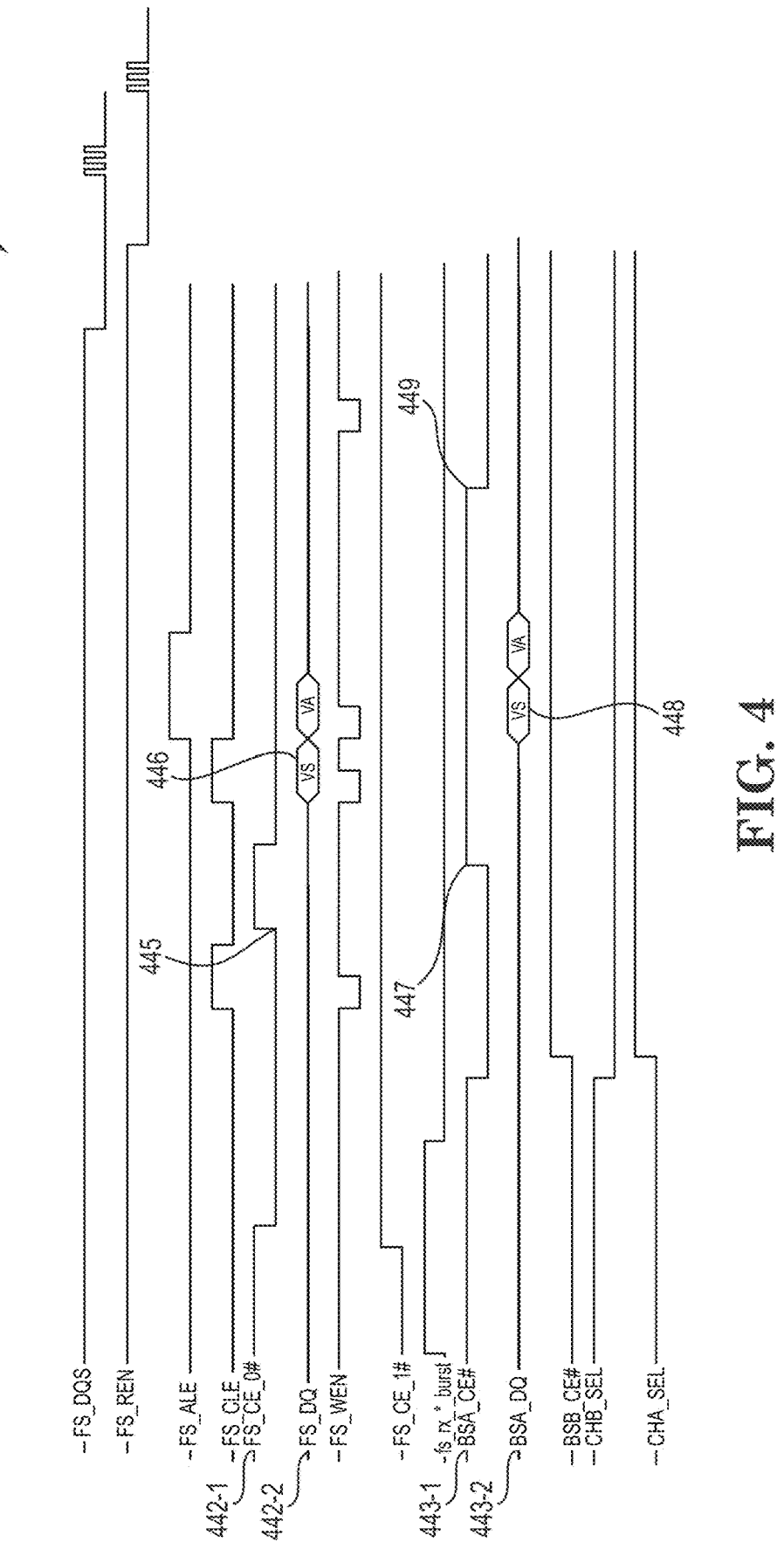
FIG. 4 illustrates timing diagram for expander device channel locking for a memory device in accordance with some embodiments of the disclosure.

FIG. 4 illustrates timing diagram 441 for expander device channel locking for a memory device in accordance with some embodiments of the disclosure. In some embodiments, the timing diagram 441 can represent how a plurality of front side signals 442-1, 442-2 correspond to a plurality of back side signals 443-1, 443-2. That is, the plurality of front side signals 442-1, 442-2 can be signals received from a host at a plurality of corresponding signal pins of an IOE device. The timing diagram 441 can illustrate how the IOE device transmits the plurality of front side signals 442-1, 442-2 from the host to a plurality of back side signals 443-1, 443-2 that are provided to memory resources.

In some embodiments, the plurality of front side signals 442-1, 442-2 can include a front side chip enable signal 442-1, a front side (data) command signal 442-2, and/or other front side signals (e.g., front side clock signal, etc.). In a similar way, the plurality of back side signals 443-1, 443-2 can include signals that correspond to the plurality of front side signals 442-1, 442-2. For example, the plurality of back side signals 443-1, 443-2 can include a back side chip enable signal 443-1, a back side (data) command signal 443-2 and/or other back side signals.

As described herein, the IOE device can receive a signal at the front side chip enable channel. The front side chip enable signal includes a low to high transition signal at 445. As described herein, the IOE device can lock the back side enable channel. In these embodiments, the back side enable signal 443-1 can be locked at 447 to prevent subsequent signals from reaching the memory devices coupled to the back side enable channel of the IOE device. As described herein, a host device can provide a command to the front side data channel of the IOE device subsequent to the low to high transition signal. The front side data signal can include the command at 446. As described herein, the command at 446 can be provided to the back side data signal at 448. As described herein, the command at 446 can be a volume select command to select a particular volume of the memory resource coupled to a back side of the IOE device.

As described herein, the IOE device can unlock the back end chip enable channel after a threshold quantity of time from receiving the low to high transition signal. The back side chip enable signal 443-1 includes an unlocking signal at 449. In this way, the back side chip enable signal 443-1 can be provided to the memory resource after the unlocking signal at 449.

FIG. 5 is a flow diagram corresponding to a method 551 for channel locking in accordance with some embodiments of the disclosure. The method 551 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 551 is performed by the channel locking component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 552, the method 551 can be executed to receive, by a memory device interface, a signal at a front side of a command enable channel from a host. In some embodiments, the signal indicates that a command is to be received. In some embodiments, the signal is a low to high transition signal received from the host. In this way, the memory device interface (e.g., IOE device, etc.) can be notified by the host that the host is to send a command within a threshold quantity of time. In some embodiments, the signal indicates that a volume select command is about to be sent to the memory device interface.

In some embodiments, the method 551 can be executed to identify a quantity of time between receiving the signal and receiving the command. In some embodiments, the memory device interface can determine a quantity of time to wait to wait for a command from the host. In some embodiments, the quantity of time can be designated by the host or programmed to the memory device interface such that the memory device interface waits the threshold quantity of time before determining that a command was not received by the host device.

At operation 553, the method 551 can be executed to lock, by the memory device interface, a back side of the command enable channel in response to the signal. In some embodiments, locking the back side of the command enable channel prevents signals that are provided to the front side of the command enable channel from being provided to memory resource coupled to the back side of the command enable channel.

In some embodiments, the method 551 can be executed to activate the data channel in response to receiving the signal at the front side of the command enable channel. As described herein, the data channel can be activated in response to receiving the signal when the signal indicates that the host is to send a command to the front side of the data channel. In this way, the front side of the data channel can be activated to receive the command (e.g., volume select command, etc.). In some embodiments, the data channel can be activated from a deactivated state. The deactivated state can be an off or low power state that allows the IOE device to conserve power (e.g., electrical power, etc.).

At operation 554, the method 551 can be executed to receive, by the memory device interface, the command at a data channel from the host. As described herein, the command can be a volume select command that includes an instruction that selects a volume of a memory resource or a portion of a memory resource. In some embodiments, the command can select a memory resource associated with the memory device interface or the command can select a memory resource associated with a different memory device interface.

At operation 555, the method 551 can be executed to unlock, by the memory device interface, the back side of the command enable channel in response to receiving the command at the data channel. In some embodiments, the memory device interface can unlock the back side of the command enable channel after a threshold quantity of time or when the command is received at the data channel. This can allow the host to provide signals to the front side of the command enable channel and the signals can be provided or transmitted to memory resources coupled to the back side of the command enable channel.

In some embodiments, the method 551 can be executed to deactivate the data channel when the command is a volume select command that includes an instruction to select a different memory device interface. In some embodiments, the method 551 can be executed to deactivate the data channel when the command is received by a different memory device interface. In some embodiments, the data channel can be deactivated to save or conserve power. In some embodiments, the data channel can be deactivated in response to the volume select command selecting a different memory device interface. In this way, a non-selected memory device interface can conserve power while the host utilizes the different memory device interface.

Figure 6:
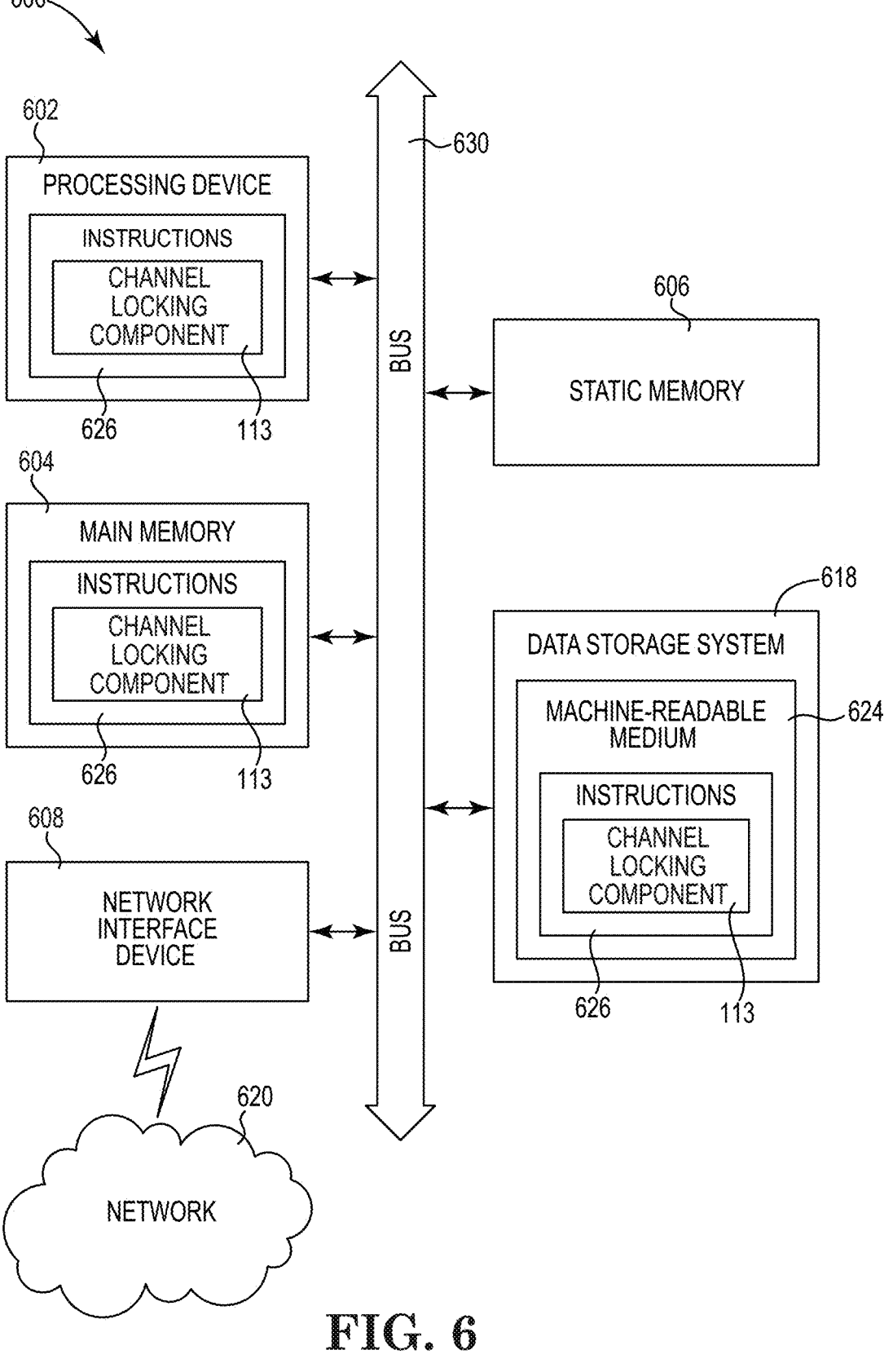
FIG. 6 is a block diagram of an example computer system in which embodiments of the disclosure may operate.

FIG. 6 is a block diagram of an example computer system in which embodiments of the disclosure may operate. For example, FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the channel locking component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

The processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a channel locking component (e.g., the channel locking component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer).

In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc. In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:

receiving, by a memory device interface, a signal at a front side of a command enable channel from a host, wherein the signal indicates that a command is to be received;

locking, by the memory device interface, a back side of the command enable channel in response to the signal;

receiving, by the memory device interface, the command at a data channel from the host; and unlocking, by the memory device interface, the back side of the command enable channel in response to receiving the command at the data channel.

2. The method of claim 1, further comprising activating the data channel in response to receiving the signal at the front side of the command enable channel.

3. The method of claim 1, further comprising deactivating the data channel when the command is a volume select command that includes an instruction to select a different memory device interface.

4. The method of claim 1, wherein locking the back side of the command enable channel prevents signals provided to the front side of the command enable channel from being provided to a memory resource coupled to the back side of the command enable channel.

5. The method of claim 1, further comprising deactivating the data channel when the command is received by a different memory device interface.

6. The method of claim 1, wherein the signal is a low to high transition signal received from the host.

7. The method of claim 1, further comprising identifying a quantity of time between receiving the signal and receiving the command.

8. An apparatus, comprising:

a plurality of memory dice; and a memory device interface to transfer communication between a host couplable to the memory device interface and the plurality of memory dice, wherein the memory device interface comprises a controller configured to:

identify a low to high transition signal at a front side of a command enable channel;

lock a back side of the command enable channel in response to identifying the low to high transition signal;

start a command timer to determine when a threshold quantity of time from receiving the low to high transition signal has been met; and unlock the back side of the command enable channel in response to receiving a command at a data channel within the threshold quantity of time.

9. The apparatus of claim 8, wherein the controller is further configured to activate the data channel in response to locking the back side of the command enable channel.

10. The apparatus of claim 8, wherein the controller is further configured to deactivate the data channel when the command is not received at the data channel within the threshold quantity of time.

11. The apparatus of claim 8, wherein the command passes to a memory die of the plurality of memory dice.

12. The apparatus of claim 11, wherein the memory die of the plurality of memory dice does not register the command when the back side of the command enable channel is locked.

13. The apparatus of claim 8, wherein the back side of the command enable channel is locked for the threshold quantity of time.

14. A system comprising:

a host; and a plurality of memory device interfaces configured to couple the host to a plurality of memory devices of the system;

wherein a first memory device interface of the plurality of memory device interfaces comprises a processing device configured to:

identify a low to high transition signal at a front side of a command enable channel;

lock a back side of the command enable channel in response to identifying the low to high transition signal;

start a command timer to determine when a threshold quantity of time from receiving the low to high transition signal has been met;

unlock the back side of the command enable channel in response to receiving a volume select command that selects the first memory device interface at a data channel within the threshold quantity of time;

deactivate the data channel when the volume select command selects a second memory device interface; and unlock the back side of the command enable channel when the threshold quantity of time is met.

15. The system of claim 14, wherein the host is coupled to the front side of the command enable channel of the first memory device interface and a front side of a command enable channel of the second memory device interface.

16. The system of claim 14, wherein the volume select command selects a portion of the plurality of memory devices.

17. The system of claim 14, wherein the processing device is further configured to activate the data channel in response to receiving the low to high transition signal.

18. The system of claim 14, wherein the processing device is further configured to receive a de-assert signal of the command enable channel from the host.

19. The system of claim 14, wherein the plurality of memory device interfaces are configured in a multi-drop configuration.

20. The system of claim 14, wherein the processing device is further configured to receive a plurality of commands at the data channel prior to receiving the volume select command at the data channel.

* * * * *